United States Patent
Sivakumar et al.

(10) Patent No.: US 11,810,558 B2
(45) Date of Patent: Nov. 7, 2023

(54) EXPLAINING ANOMALOUS PHONETIC TRANSLATIONS

(71) Applicant: INTERNATIONAL BUSINESS MACHINES CORPORATION, Armonk, NY (US)

(72) Inventors: Gandhi Sivakumar, Melbourne (AU); Kushal S. Patel, Pune (IN); Luke Peter Macura, Melbourne (AU); Sarvesh S. Patel, Pune (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 219 days.

(21) Appl. No.: 17/330,612

(22) Filed: May 26, 2021

(65) Prior Publication Data
US 2022/0383861 A1   Dec. 1, 2022

(51) Int. Cl.
*G10L 15/00* (2013.01)
*G10L 15/187* (2013.01)
(Continued)

(52) U.S. Cl.
CPC .......... *G10L 15/187* (2013.01); *G06F 40/205* (2020.01); *G10L 15/1822* (2013.01);
(Continued)

(58) Field of Classification Search
None
See application file for complete search history.

(56) References Cited

U.S. PATENT DOCUMENTS

| 6,631,346 | B1 * | 10/2003 | Karaorman | ......... G10L 15/1822 704/275 |
| 7,260,534 | B2 * | 8/2007 | Gandhi | ................... G10L 15/01 704/235 |

(Continued)

FOREIGN PATENT DOCUMENTS

| CN | 103959283 A | 7/2014 |
| CN | 104464736 A | 3/2015 |

(Continued)

OTHER PUBLICATIONS

Mell et al., "The NIST Definition of Cloud Computing", NIST, Special Publication 800-145, Sep. 2011, 7 pages.
(Continued)

*Primary Examiner* — Richard Z Zhu
(74) *Attorney, Agent, or Firm* — Rakesh Roy; Andrew D. Wright; Calderon Safran & Cole, P.C.

(57) ABSTRACT

A method includes: receiving, by a computing device, a digital voice stream; receiving, by the computing device, converted text that represents the digital voice stream; identifying, by the computing device, an erroneously converted portion of the converted text; selecting, by the computing device, the erroneously converted portion for explainability processing; parsing, by the computing device, the erroneously converted portion into parts based on a predetermined parsing level; collecting, by the computing device, supplementary input data related to the erroneously converted portion; and determining, by the computing device and based on the supplemental input data, a reason why the erroneously converted portion was erroneously converted.

20 Claims, 9 Drawing Sheets

(51) Int. Cl.
*G10L 15/22* (2006.01)
*G10L 15/18* (2013.01)
*G06F 40/205* (2020.01)
*G10L 15/20* (2006.01)
*G10L 15/26* (2006.01)
*G10L 15/06* (2013.01)
*G10L 15/02* (2006.01)
*G10L 15/08* (2006.01)

(52) U.S. Cl.
CPC .............. *G10L 15/20* (2013.01); *G10L 15/22* (2013.01); *G10L 15/02* (2013.01); *G10L 15/26* (2013.01); *G10L 2015/0638* (2013.01); *G10L 2015/086* (2013.01); *G10L 2015/221* (2013.01); *G10L 2015/225* (2013.01)

(56) References Cited

U.S. PATENT DOCUMENTS

| | | | | |
|---|---|---|---|---|
| 7,516,070 | B2* | 4/2009 | Kahn | G06F 40/174 |
| | | | | 704/277 |
| 7,949,523 | B2* | 5/2011 | Imoto | G10L 15/065 |
| | | | | 704/226 |
| 9,495,127 | B2* | 11/2016 | Ballinger | G10L 15/30 |
| 9,836,455 | B2 | 12/2017 | Martens et al. | |
| 10,229,682 | B2* | 3/2019 | Grant | G06F 40/174 |
| 11,495,214 | B2* | 11/2022 | Shin | G10L 15/02 |
| 2006/0122837 | A1* | 6/2006 | Kim | G10L 15/22 |
| | | | | 704/E15.04 |
| 2006/0206320 | A1* | 9/2006 | Li | G10L 21/0208 |
| | | | | 704/226 |
| 2007/0225975 | A1* | 9/2007 | Imoto | G10L 15/065 |
| | | | | 704/233 |
| 2013/0073286 | A1* | 3/2013 | Bastea-Forte | G10L 15/22 |
| | | | | 704/244 |
| 2015/0032443 | A1* | 1/2015 | Karov | G06F 40/30 |
| | | | | 704/9 |
| 2015/0187350 | A1* | 7/2015 | Kim | G10L 15/01 |
| | | | | 704/231 |
| 2017/0256262 | A1* | 9/2017 | Ramachandra | G10L 15/14 |
| 2018/0218732 | A1* | 8/2018 | Grant | G06F 3/167 |
| 2019/0147870 | A1* | 5/2019 | Taki | G10L 15/22 |
| | | | | 704/233 |
| 2019/0244122 | A1 | 8/2019 | Li et al. | |

FOREIGN PATENT DOCUMENTS

| | | |
|---|---|---|
| CN | 106448675 B | 2/2017 |
| CN | 112084775 A | 12/2020 |

OTHER PUBLICATIONS

Unknown, "https://cloud.google.com/speech-to-text/docs/enhanced-models", downloaded on Mar. 29, 2021, 4 pages.
Sarkar, "Google's new Explainable AI (xAI) service", towards data science, Nov. 25, 2019, 12 pages.
Zeng et al., "Speech recognition with amplitude and frequency modulations", Feb. 15, 2005, 6 pages.
Peters et al., "Transformation-Based Error Correction for Speech-to-Text Systems", ISCA Archive, http://www.isca-speech.org/archive, Oct. 4-8, 2004, 4 pages.
Daglarli et al., "Explainable Artificial Intelligence (xAI) Approaches and Deep Meta-Learning Models", IntechOpen; Advances in Deep Learning, (http://creativecommons.org/licenses/by/3.0), downloaded Apr. 30, 2021, 17 pages.

* cited by examiner

| Policy Level | Metadata Requirement | Is default |
|---|---|---|
| Word level | Moderate | Yes |
| Sentence level | Less | No |
| Alphabet level | Very Large | No |
| Phonetic error only | Moderate | Yes |
| All text explanation | Very Large | No |

EXPLAINING ANOMALOUS PHONETIC TRANSLATIONS

BACKGROUND

Aspects of the present invention relate generally to audio to text conversion and, more particularly, to determining a reason for an error in speech to text conversion.

Modern machines are becoming intelligent. They not only serve humans in a smart way through intangible interfaces (cognitive devices which can communicate with humans in natural language) but also through tangible interfaces such as, for example, robots.

SUMMARY

In a first aspect of the invention, there is a computer-implemented method including: receiving, by a computing device, a digital voice stream; receiving, by the computing device, converted text that represents the digital voice stream; identifying, by the computing device, an erroneously converted portion of the converted text; selecting, by the computing device, the erroneously converted portion for explainability processing; parsing, by the computing device, the erroneously converted portion into parts based on a predetermined parsing level; collecting, by the computing device, supplementary input data related to the erroneously converted portion; and determining, by the computing device and based on the supplemental input data, a reason why the erroneously converted portion was erroneously converted.

In another aspect of the invention, there is a computer program product including one or more computer readable storage media having program instructions collectively stored on the one or more computer readable storage media. The program instructions are executable to: receive a digital voice stream; receive converted text that represents the digital voice stream; identify an erroneously converted portion of the converted text; select the erroneously converted portion for explainability processing; parse the erroneously converted portion into parts based on a predetermined parsing level; collect supplementary input data related to the erroneously converted portion; and determine, based on the supplemental input data, a reason why the erroneously converted portion was erroneously converted.

In another aspect of the invention, there is system including a processor, a computer readable memory, one or more computer readable storage media, and program instructions collectively stored on the one or more computer readable storage media. The program instructions are executable to: receive a digital voice stream; receive converted text that represents the digital voice stream; identify an erroneously converted portion of the converted text; select the erroneously converted portion for explainability processing; parse the erroneously converted portion into parts based on a predetermined parsing level; collect supplementary input data related to the erroneously converted portion; and determine, based on the supplemental input data, a reason why the erroneously converted portion was erroneously converted.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
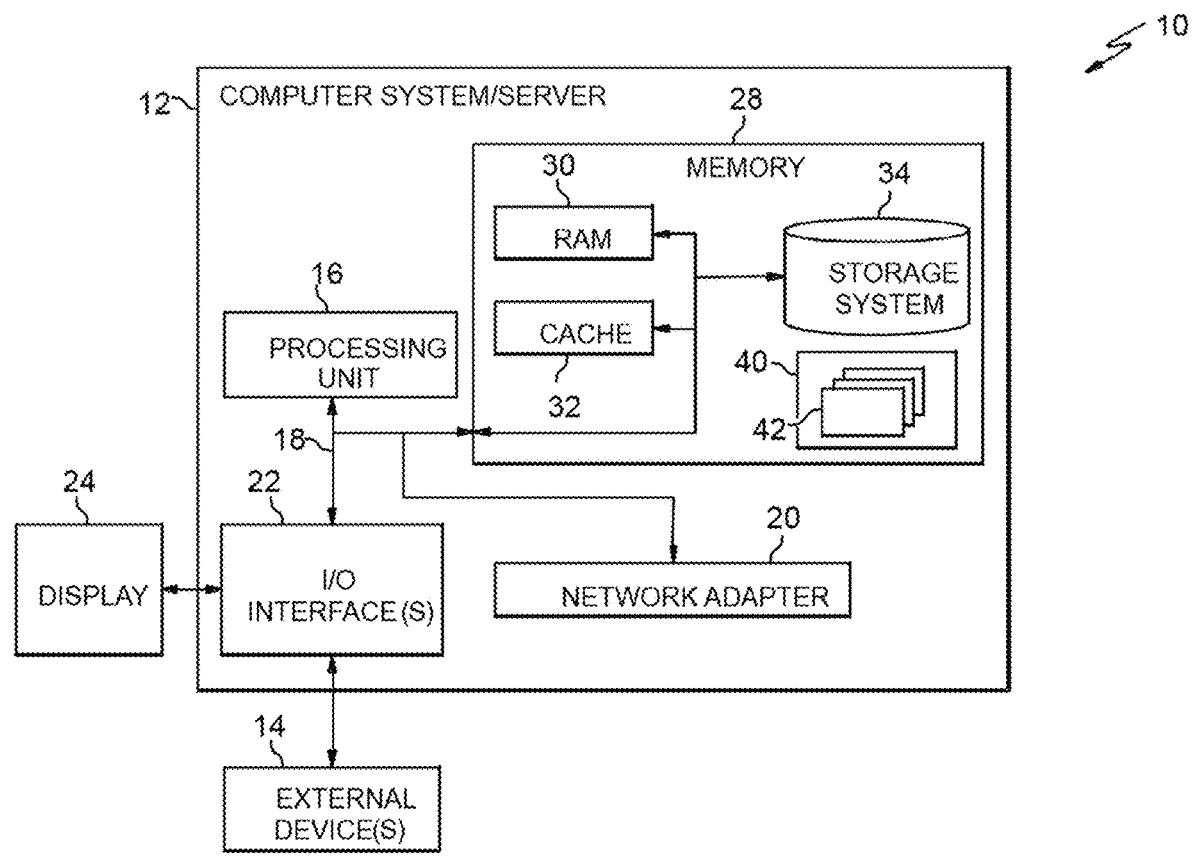
FIG. 1 depicts a cloud computing node according to an embodiment of the present invention.

Aspects of the present invention relate generally to audio to text conversion and, more particularly, to determining a reason for an error in speech to text conversion. According to aspects of the invention a conversion explainability service receives a digital voice stream and a converted text that represents the digital voice stream from a speech to text conversion system. The conversion explainability service also receives or generates an identification of one or more erroneous conversions in the converted text. In embodiments, the conversion explainability service parses the erroneous conversion and analyzes the parsed conversion to determine one or more reasons for the conversion error. In this manner, implementations of the invention provide a subject matter expert or other auditor of the text conversion one or more suspected reasons for the error. The subject matter expert or other auditor possesses additional information, in the form of the suspected reasons, to determine the proper conversion when correcting the erroneous conversion.

Implementations of the invention are improvements to the functioning of a computer. For example, determining reasons for erroneous conversions in STT conversion improves the efficiency and precision of SST conversion systems. For example, determining that a particular conversion error is caused by a word rate of conversion that is above a threshold improves the accuracy and efficiency of future conversions by modifying the word rate of conversion to a rate below the threshold. In addition, implementations of the invention are practical applications of combinations of features regarding explaining anomalous phonetic translations. For example, determining, by a computing device, that the erroneously converted portion is eligible for explainability processing; parsing, by the computing device, the erroneously converted portion into parts based on a predetermined parsing level; collecting, by the computing device, supplementary input data related to the erroneously converted portion; and determining, by the computing device and based on the supplemental input data, a reason why the erroneously converted portion was erroneously converted provides a practical solution to problems associated with automated speech to text translation.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Embodiments include some or all of the following features:

(1) A conversion explainability service running as a cloud situated instance initiates itself, loads required data structures and sends an INIT SIGNAL to all the peer services in a plane. The service loads a metadata cache and other pre-determined last instance information to the metadata cache for further processing. The system prepares the contiguous memory for incoming signal data and keeps the pointer ready for upcoming input signals from speech to text systems.

(2) Upon reception of an input voice audio file from a speech to text (STT) system, the service performs voice to text initial validation of the input signal and sends information to an explainability module to compute explanations for errors if needed. The service receives (from the STT system, for example) a policy definition of explainability such as, for example, "explain all", "explain only on error", etc., and accordingly initiates an expandability module. In cases where the policy definition is set as "explain all", the audio stream is supplied to the explainability module.

(3) When a trigger is sent to the explainability module, the voice stream and conversion information is collected from the STT system. A web-socket based connection is opened to exchange a voice wave report and related object metadata for the respective audio file. Once system authentication is performed, the web-socket is created, and the information exchange is started using in-band PDU based transfer. A memory pointer to a free memory location is shared with the STT system to load the voice stream (for example, a Waveform Audio, or wave, file) for further processing. The input wave file is loaded in a local cache for attribute extraction and reasons for errors in conversion are collected as part of tags on the wave file.

(4) A reason detector triggers additional insights articulation for an explainability calculation. The system connects with the STT system to retrieve converted text for respective audio files and map it with a sequence of wavelets to determine an error prone region in the complete wave.

(5) The supplementary computation in feature (4) is performed by configuration-based attribute parsing mechanisms wherein user defined explainability levels are gathered and accordingly the processing is executed.

(6) The policy validation is performed by the explainability module based on loaded user preferences and default policy matching.

(7) In the error only mode of operation, the additional insights manipulation is performed only when a phonetic is not known to the conversion system. When a word is translated to the textual format, dictionary mapping is used to validate correctness of the word. In cases where the word is not present in the dictionary, then this is used as the explanation for the error and is stored as a metadata observation.

(8) The system gathers the possible reasons of incorrect translation. The system triggers supplementary input data collection and accordingly the reasons are determined.

(9) To get the reasons of incorrect translation, the characteristics of the audio signal (voice stream) are extracted, and respective tags are mapped from a tag library. The tag library includes pre-loaded tags of voice categories with probable error explanation. The system saves the tags, input voice sample and the converted text in metadata mapper classes that are used to derive the reasons. The system extracts voice attributes by voice recognition and other attribute metadata extraction techniques. The system calculates common characteristics like frequency and amplitude of the audio wave signals along with the cardinality of the words (or alphabets) per seconds from the voice stream and accordingly maps them with their relevance matrices. The system traverses defined threshold policy to match the generated attribute and voice category. For example, if a person is speaking very fast and the audio extractor detects 15 words in 5 seconds (which is 30% above a threshold value), the system adds tags based on the threshold traversing and saves the tags along with the converted text. Exemplary attributes include: phonetic not known; background noise; word not pronounced well; word not in dictionary; person is speaking very fast; microphone is very near to speaker; frequency is higher than usual; and audio decibel level (sound pressure level) is high or low.

(10) The system gathers the information using additional metadata and symbolizes the generated attribute as an anomaly in speech to text conversion. The system gathers and saves the reasons along with the information of input wave and the converted text in a relational database for future reference in an explainability database.

(11) When any enquiry regarding an incorrect word is made by a subject matter expert (SME) or a data scientist or an auditor (through, for example, a user interface), the system triggers the relational query to the database with a correct file and word (or sentence) object ID. In response to the enquiry, the system extracts and displays reasons over an integrated user interface based interface which provides clarification of conversion errors.

Some cognitive interfaces possess artificial intelligence and have the ability to visualize and should also be able to obtain additional information from resources for more appropriate processing via cognition embodiment and communicating with other devices. Modern complex artificial intelligence (AI) techniques, such as deep learning and genetic algorithms, are naturally opaque. AI systems are actively dependent on a training corpus and learn from it to function (for example, judge) in a more natural way. This improves the AI system's performance day-by-day based on more associated learning and history.

Explainable AI (XAI) refers to methods and techniques in the application of artificial intelligence technology such that the results of the solution can be understood by human experts. This contrasts with an approach in machine level modeling (MLM) in which the stakeholders cannot explain why the AI arrived at a specific decision. Hence, there is a benefit to justifying the information and insights generated by an AI system. XAI is an implementation of explanation. In XAI models, metadata is generated that gives evidences and a confidence level to end users that can be validated manually. This gives a score explaining how each factor contributed to a final result of the model predictions. This supports a "Safe AI" concept by which the humans can see what is being generated inside the AI MLM. There are some MLMs that do not give the flexibility for explainability and hence are not adopted for business-critical decisions. Hence, explainable MLMs are beneficial.

One of the basic building blocks for a natural language processor is speech to text conversion wherein user voice inputs are collected by the system and are converted to written words. Once the user inputs are converted to a textual format, it becomes easier to process the data. Speech to text (STT) software is a type of software that effectively takes audio content and transcribes it into written words in a word processor or other display destination. This type of speech recognition software is extremely valuable to anyone who generates a large volume of written content without the need of manual typing, as well as with modern AI interactive systems that uses STT as a first data conversion step before actual data processing. In terms of technical function, some STT software programs break spoken-word audio down into short "samples" and associate those samples with simple phonemes or units of pronunciation. Then, complex algorithms sort the results to try to predict the word or phrase that was said. STT software has improved in accuracy and evolved in general functionality to play a larger role in modern communications over digital platforms.

There is a benefit to having explainability of speech to text translation and for additionally inferred information in the case of a detected conversion anomaly. In some STT conversion systems, input phonetics bit errors are converted by the conversion system to the textual format, which results in incorrect text and anomalies in the conversion. When a subject matter expert (SME) evaluates the speech to text translation (or it is evaluated by manual or automated AI system auditing), there is no way by which an SME can know why the tool has converted the portion of speech into an erroneous text. There are multiple possible factors for such error injection during conversion, but there is a benefit to having additional information regarding speech to text explainability for the SME and/or data scientists while evaluating the conversion. Further, there are multiple possibilities that cause the bit errors in the conversion, including, for example, input voice condition, and an out of date training corpus of the STT system. As there are multiple factors associated with errors in the conversion, there is a benefit to having additional insights associated with errors. Further, in domains such as the medical field and other important conversion projects, it is becoming very important to know the reasons for a conversion anomaly in an explainable way. In STT conversion, the input phonetic and linguistic components vary based on vocal and location influenced characteristics, which are possible causes of errors being introduced in the conversion. Despite STT corpus training and STT algorithms, the chance of errors exists and the cause of these errors are currently unexplained. Embodiments of the invention provide a mechanism of explainability in STT conversion and a gathering of configurable metadata information, in a connection socket, related to the reasons of the conversion errors in STT conversion. Embodiments of the invention further gather additional context driven evidence for explainability of STT conversion and provide this evidence.

For example, in some systems, when an input audio file is received by an STT conversion system and some of the converted words are not known words or part of a training corpus, then there is no way by which this information can be retained for auditing purposes and the reasons of the incorrect translation will not be discovered for explainability of the translation. The system will not know about correct or incorrect words, hence it should keep the information for future reference with the related consequences and derived artifacts to explain the text conversion. Consider an example wherein the system receives the audio file with voice as "Mum Johnson was past presideesent of the USA". When the speech to text conversion logic translates the audio to the text along with converted bit errors in the file, there is no way by which one can audit the reasons of incorrect translation of "Mrrrrr" and "presideesent". There can be multiple reasons for the errors, including input errors or conversion errors, but the explainability is missing for such conversion. Embodiments of the invention address the explainability of conversion errors.

Embodiments of the invention provide a method, system, and apparatus that will work with speech to text conversion systems and provide a mechanism for explainability of the conversion bit errors and accordingly performs additional investigation for converted words for better explanation of an erroneous conversion. Embodiments comprise a service running in conjunction with a speech to text conversion engine and/or a cloud situated instance of explainability of voice to text conversion. Embodiments gather the voice stream and conversion information and accordingly trigger additional insights articulation for an explainability calculation. Multiple factors can affect speech to text conversion such as, for example, background noise, training errors, or relative samples not being trained. The explainability for these errors is advantageous as subsequent AI activities are typically taking the converted text as input for further processing. Embodiments of the invention collect the information from the wave files and the conversion text as input and determine explainability triggering. This triggered additional computation is performed by configuration-based attribute parsing mechanisms wherein user defined explainability levels are gathered and accordingly the processing is executed.

As an example, if a user has defined word level conversion explainability then every word is collected from the wave files and the text conversion for processing. In embodiments, the policies are word level, sentence level, alphabet level, error only, etc. This is based on the deployment necessities. For example, conversion in the medical field may require more precision and use alphabet level conversion explainability, while in a default condition word level conversion explainability is used. In embodiments, in the error only mode of operation, the additional insights manipulation will be performed only when a phonetic is not known to the conversion system. For example, if the system is not trained for the word "Mrrrrrrr", then the additional explainability tracing will be enabled because the converted word is unknown.

When the input trigger is received by the explainability conversion system, then the wave file and converted text is taken as input by the service instance and the possible reasons of incorrect translation are gathered. The system triggers supplementary input data collection and accordingly the reasons for the errors are be determined.

Embodiments calculate the characteristics of the audio signal and save the characteristics in metadata mapper classes which are used to derive the reasons. The system determines from the voice signal characteristics like frequency and amplitude of the audio wave signals along with the cardinality of the words (or alphabets) per seconds, and accordingly maps them with their relevance matrices.

These conclusions are gathered by an additional information collector to the speech recognition and detection system and accordingly the reasons will be gathered. In embodiments, the system saves these reasons along with the information of input wave and the converted text in a relational database which is used for auditing purposes. When an SME (or a data scientist or an auditor) wants the reason for an incorrect conversion, a proposed explainability manager offers the articulated information along with the reasons. Embodiments further provide an integrated user interface (UI) based interface which provides the clarification of conversion errors. When the SME assesses the translation, the system receives the enquiries and explains the reason for the erroneous conversion.

Embodiments provide advantages such as, for example: explaining the way by which errors in STT conversion occur (which assists data scientists or deployment auditors assessing conversions), which promotes trust in AI models used for conversion; providing linguistic and acoustics explainability for speech to text conversion that is considered in making subsequent processing decisions after conversion; and enabling manufacturers of personal and embedded devices to provide more efficient monitoring of resources, thus helping reducing non-related content.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
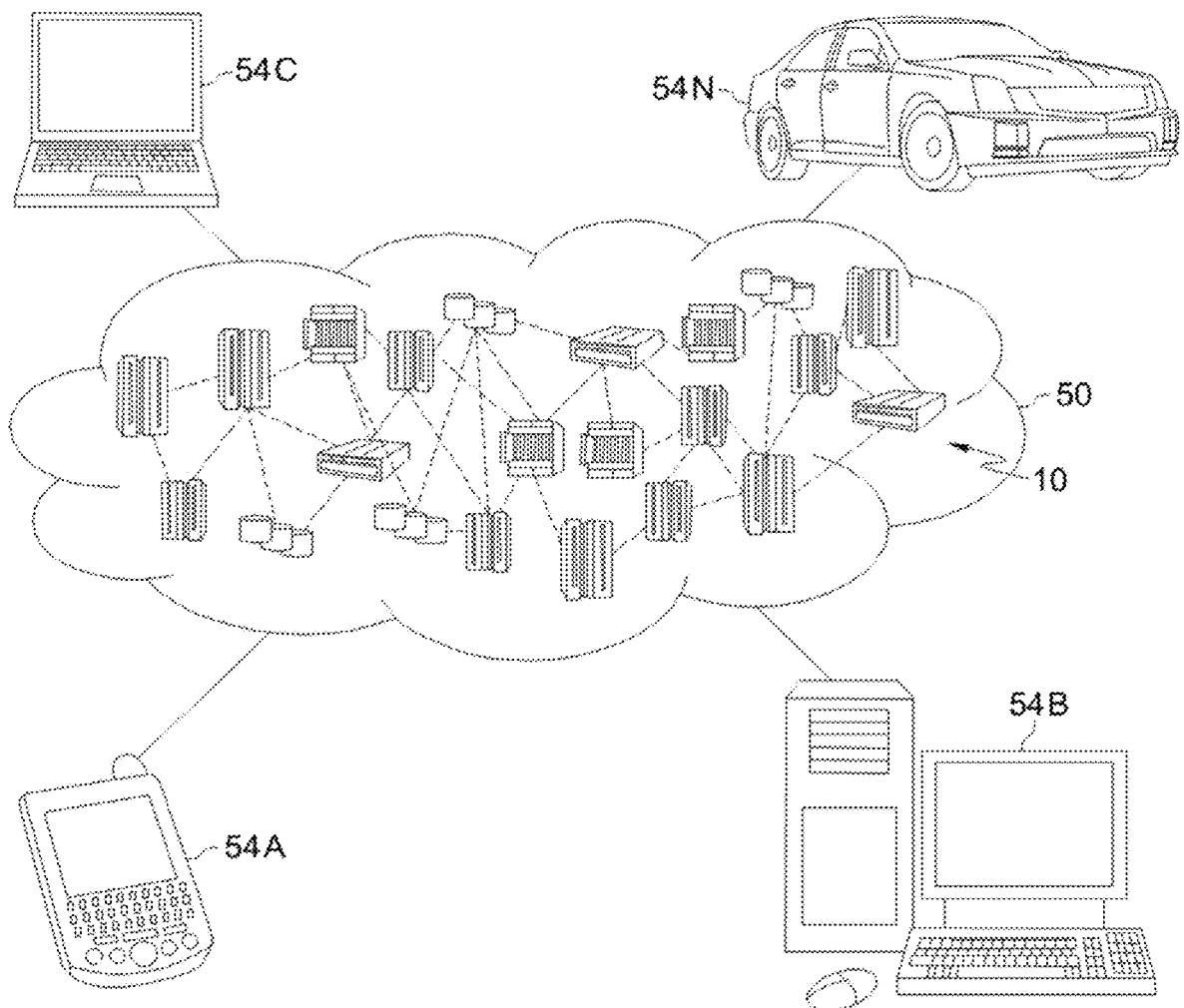
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
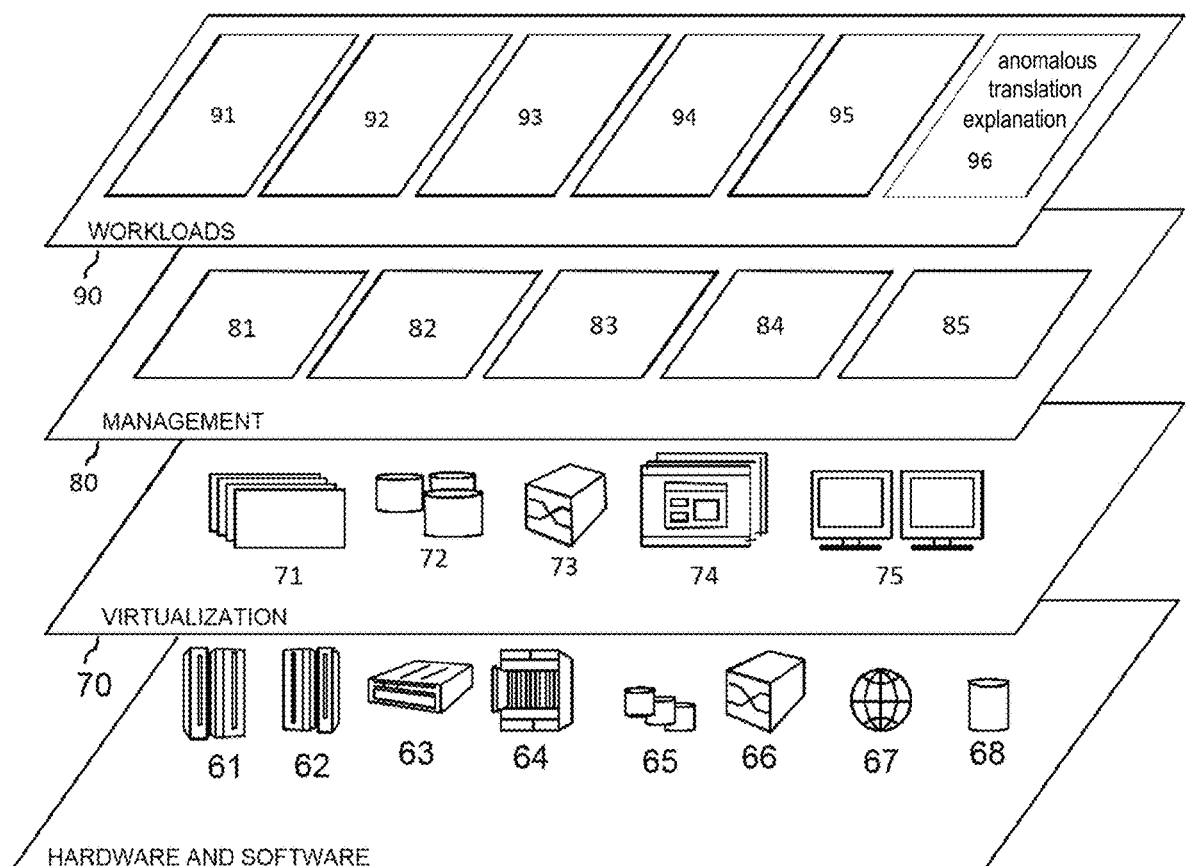
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomalous translation explanation 96.

Implementations of the invention may include a computer system/server 12 of FIG. 1 in which one or more of the program modules 42 are configured to perform (or cause the computer system/server 12 to perform) one or more functions of the anomalous translation explanation 96 of FIG. 3. For example, the one or more of the program modules 42 may be configured to: receive a digital voice stream; receive converted text that represents the digital voice stream; identify an erroneously converted portion of the converted text; select the erroneously converted portion for explainability processing; parse the erroneously converted portion into parts based on a predetermined parsing level; collect supplementary input data related to the erroneously converted portion; and determine, based on the supplemental input data, a possible reason why the erroneously converted portion was erroneously converted.

Figure 4:
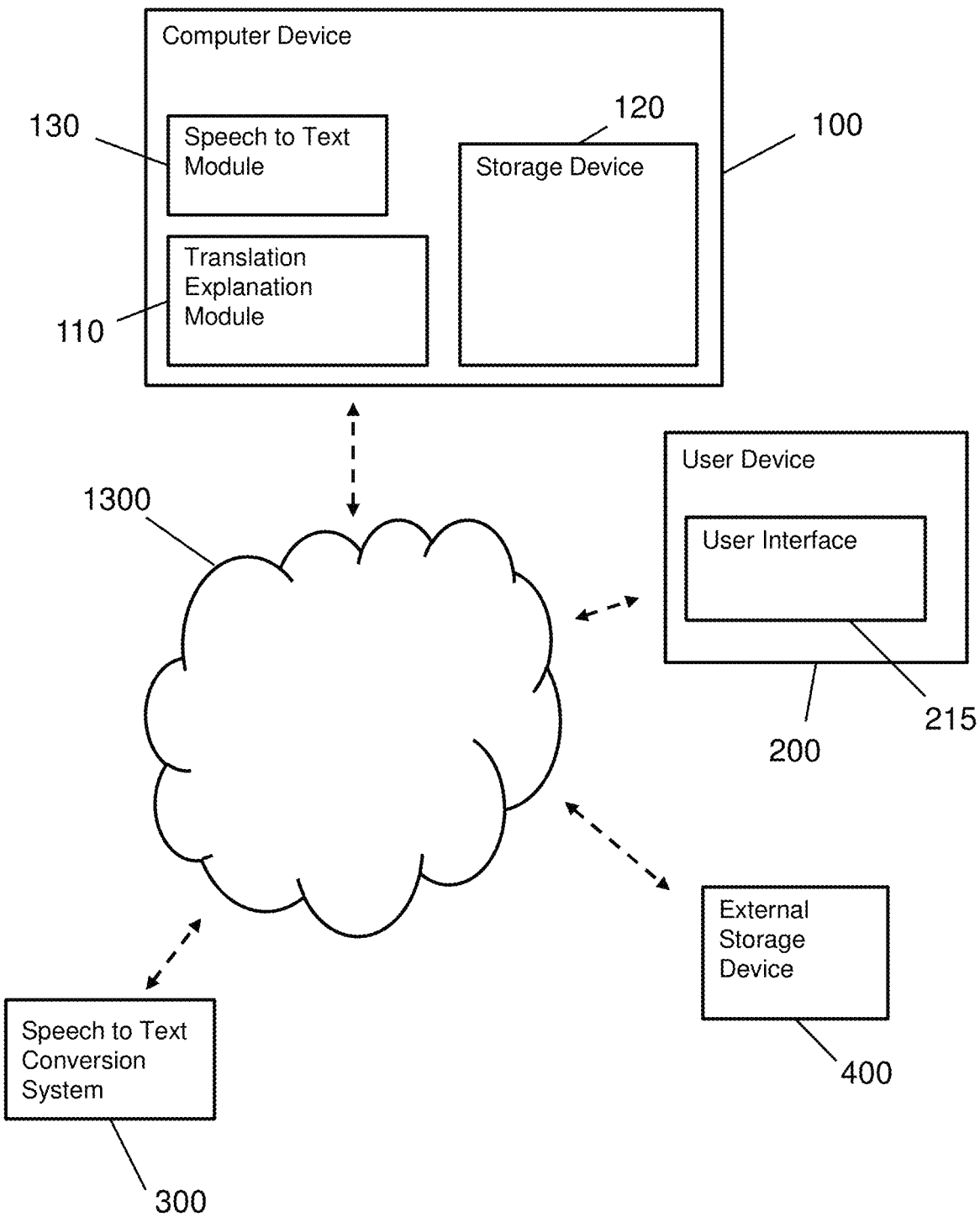
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more networks 1300 such as, for example, cloud computing environment 50 of FIG. 2. In this example, computer device 100 includes a translation explanation module 110, for example, one or more of program modules 42 in FIG. 1, a storage device 120 such as, for example, storage system 34 in FIG. 1, and a speech to text module 130, for example, one or more of program modules 42 in FIG. 1.

FIG. 4 shows a user device 200 such as, for example, another computer device having some or all of the features of computer system/server 12 in FIG. 1, that provides a user interface 215 for a user to interact with translation explanation module 110 as described with reference to FIG. 5, below. In embodiments, user device 200 is a desktop computer, laptop computer, or tablet computer. FIG. 4 shows a speech to text conversion system 300 such as, for example, another computer device having some or all of the features of computer system/server 12 in FIG. 1, that provides speech to text conversions instead of, or in addition to, speech to text conversions provided by speech to text module 130. In embodiments, speech to text conversion system 300 is a server or other computer device located remotely from user device 200 and/or computer device 100.

In embodiments, computer device 100 comprises translation explanation module 110, which may comprise one or more program modules such as program modules 42 described with respect to FIG. 1. Computer device 100 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

FIG. 4 shows an external storage device 400 such as, for example, another computer device having some or all of the features of computer system/server 12 in FIG. 1, that is external to computer device 100 and contains data useful to one or more of translation explanation module 110, speech to text module 130, and speech to text conversion system 300 such as for example, a corpus of possible reasons why a particular translation is erroneous. In embodiments, one or more databases that are accessed by translation explanation module 110 are stored on storage device 120.

Figure 5:
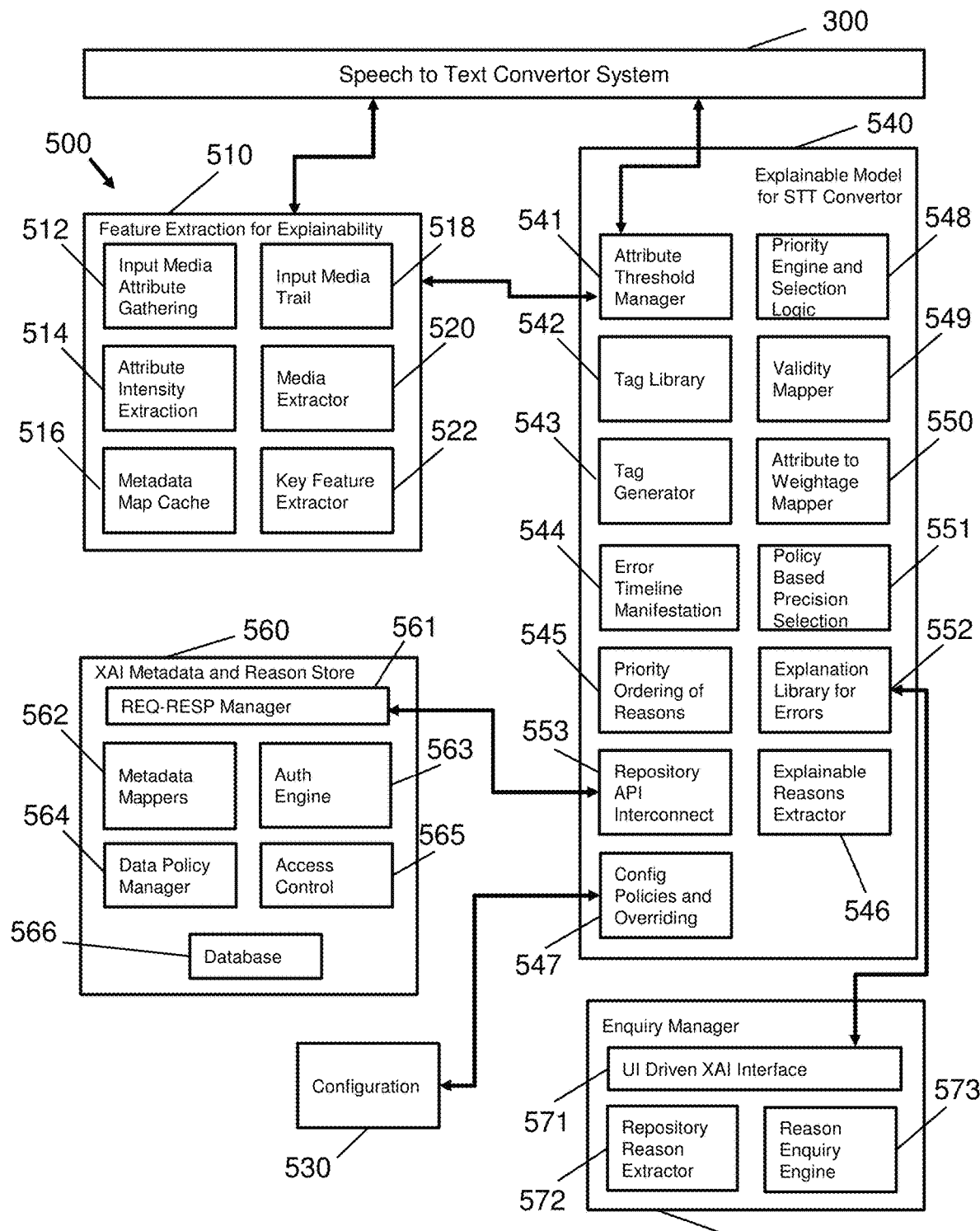
FIG. 5 shows a block diagram of an exemplary environment in accordance with aspects of the invention.

FIG. 5 shows an exemplary system in accordance with embodiments of the invention. In FIG. 5, a conversion explainability service 500 runs in conjunction with speech to text (STT) conversion system 300 (or a cloud situated instance of conversion explainability service 500). In embodiments, the features of conversion explainability service 500 are performed by translation explanation module 110 in FIG. 4. FIG. 5 shows one of many different configurations of conversion explainability service 500 in accordance with embodiments of the invention. Other embodiments include fewer or more components than those shown in FIG. 5.

In the embodiment shown in FIG. 5, conversion explainability service 500 includes a feature extraction for explainability module 510, a configuration policies store 530, an explainable model for speech to text convertor 540, an explainable artificial intelligence (XAI) metadata and reason store 560, and an enquiry manager 570.

Feature extraction for explainability module 510 communicates with STT conversion system 300 to extract information relevant to explaining reasons for erroneous STT conversions. The following exemplary modules are included in this example of feature extraction for explainability module 510. An input media attribute gathering module 512 gathers input media that includes attributes of a digital voice stream and a text conversion of the digital voice stream. In embodiments, input media attribute gathering module 512 identifies an erroneously converted portion of the converted text. In embodiments, input media attribute gathering module 512 selects the erroneously converted portion for explainability processing. An attribute intensity extraction module 514 extracts the intensity of the attributes gathered by input media attribute gathering module 512. Non-exclusive examples of attribute intensity include amplitude and frequency of speech in the digital voice stream. A metadata map cache 516 stores and maps the media (which, in embodiments, includes metadata) gathered by input media attribute gathering module 512. An input media trail 518 stores the digital voice stream and the text conversion input into feature extraction for explainability module 510. A media extractor 520 extracts information from input media trail 518 that is related to a portion of the conversion that is indicated as an erroneous conversion and determines a characteristic of the erroneously converted portion of the conversation. This information is used by explainable model for speech to text convertor 540 in determining reasons for erroneous conversions. A key feature extractor 522 extracts from the digital voice stream and/or the text conversion features of (or relevant to) the text conversion for use by explainable model for speech to text convertor 540 in determining reasons for erroneous conversions. As shown by the double headed arrows in FIG. 5, feature extraction for explainability module 510 and explainable model for speech to text convertor 540 communicate with each other.

Explainable model for speech to text convertor 540 communicates with feature extraction for explainability module 510 to obtain information relevant to explaining reasons for erroneous STT conversions. The following exemplary modules are included in this example of explainable model for speech to text convertor 540. An attribute threshold manager module 541 allows entry and revision of attribute thresholds that conversion explainability service 500 uses to determine what qualifies as an error. A tag library 542 stores pre-loaded tags of voice categories with probable error explanation. A tag generator 543 generates tags for storing in tag library 542. An error timeline manifestation module 544 records a timeline of the errors relative to each other, the digital voice stream, and the converted text. A priority ordering of reasons module 545 orders reasons for errors based on one or more factors such as, for example, likelihood of being the correct reason for error, and source of reason for error (such as, for example, frequency and amplitude of speech versus speed of speech). An explainable reasons extractor 546 extracts reasons from a database of reasons based on the metadata associated with the erroneous conversion. A configuration policies and overriding module 547 stores configuration polies and permits a user access to the policies for the purpose of overriding or otherwise modifying the configuration policies. A priority engine and selection logic module 548 selects the appropriate priority for a particular erroneous conversion and, in some embodiments, allows a user to select or modify the priority. A validity mapper module 549 determines, tracks, and stores a validity of each suspected reason for error so that this information is made available for processing future conversions. An attribute to weighting mapper module 550 applies weightings to different attributes so that different attributes are afforded different levels of importance when conversion explainability service 500 determines possible reasons for error. A policy based precision selection module 551 selects a precision (for example, word level parsing) for a given policy (for example, medical subject matter). An explanation library for errors 552 stores reasons for error for future use by conversion explainability service 500 in explaining conversion errors. A repository application programming interface (API) interconnect 553 connects explainable model for speech to text convertor 540 to XAI metadata and reason store 560.

XAI metadata and reason store 560 communicates with explainable model for speech to text convertor 540 to transmit and receive information relevant to explaining reasons for erroneous STT conversions. The following exemplary modules are included in this example of XAI metadata and reason store 560. A REQ-RESP manager 561 manages requests from explainable model for speech to text convertor 540 for data stored in XAI metadata and reason store 560, and responses to those requests. Metadata mappers module 562 maps metadata to corresponding parsed portions of the converted text. In embodiments, metadata mappers module 562 stores as metadata a characteristic of the erroneously converted portion with the erroneously converted portion. An authorization engine 563 confirms that a particular user possesses the require authorization to access various parts of conversion explainability service 500. A data policy manager 564 provides access to data polices such as, for example, the policies that determine the parsing level of erroneous conversions. An access control module 565 controls access to the various parts of conversion explainability service 500 based on, for example, input received from authorization engine 563. A database 566 stores the various data used by the various modules of conversion explainability service 500.

Enquiry manager 570 communicates with explainable model for speech to text convertor 540 to manage enquiries that are relevant to explaining reasons for erroneous STT conversions. The following are exemplary modules are included in this example of enquiry manager 570. A user interface driven XAI interface 571 interconnects an AI process or application that processes or otherwise uses the converted text to explainable model for speech to text convertor 540. A repository reason extractor 572 retrieves data related to a particular reason for use by the subject matter expert or other auditor. A reason enquiry engine 573 facilitates the communication between the subject matter expert or other auditor and conversion explainability service 500.

Figures 6, 7:
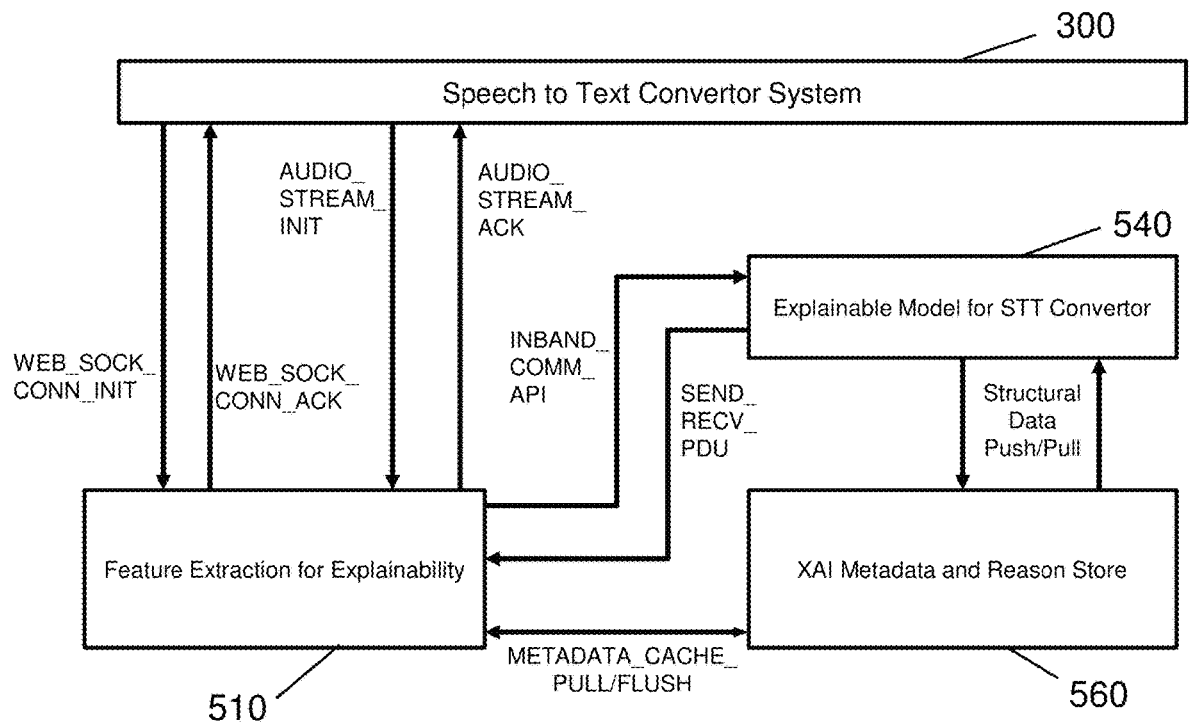
FIG. 6 shows an exemplary system in accordance with aspects of the invention.
FIG. 7 shows exemplary policy levels in accordance with aspects of the invention.

FIG. 6 shows an example of connection establishment between speech to text convertor system 300, feature extraction for explainability module 510, explainable model for speech to text convertor 540, and XAI metadata and reason store 560.

FIG. 7 shows examples of policy levels 700 for parsing and their related metadata requirement. In embodiments, policy based precision selection module 551 (shown in FIG. 5) selects a precision (i.e., a policy level) from the policy levels 700 shown in FIG. 7 that corresponds to the desired level (word, sentence, etc.) of parsing. FIG. 7 also shows an example of which of the policy levels are default levels used for general processing and which levels are selectable for specific processing. For example, in an embodiment, processing of a STT conversion of a medical lecture is assigned a policy level of "alphabet level" in order to capture small differences in technical words having different meanings. Such a policy level has a very large metadata requirement as compared to a word level or sentence level policy.

Figure 8:
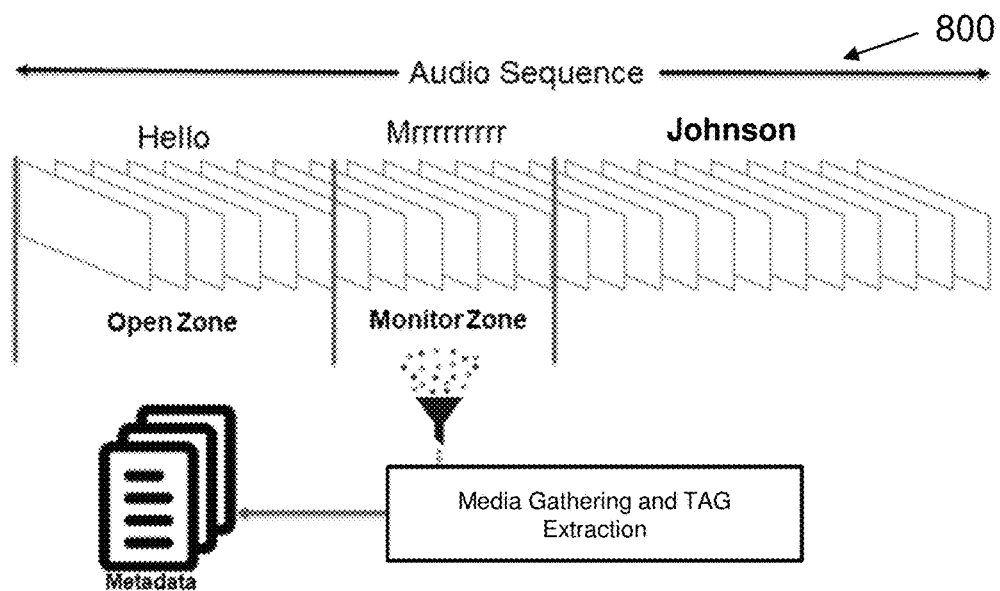
FIG. 8 shows an audio sequence in accordance with aspects of the invention.

FIG. 8 shows an example of an audio sequence 800 in which a portion of the sequence, "Hello", does not require explainability processing because it is a known and recognized word with no erroneous conversion. In FIG. 8, conversion explainability service 500 considers such a portion an open zone in that no processing is needed. Also shown in FIG. 8 is a portion of the sequence, "Mrrrrrrrrr", requires for which explainability processing is beneficial because it is tagged as an erroneous conversion. In FIG. 8, conversion explainability service 500 considers such a portion a monitor zone in that processing is deemed appropriate. As show in FIG. 8, conversion explainability service 500 gathers media (the digital voice stream and the text conversion) for the portion of the audio sequence that is in the monitoring zone and extracts any tags associated with that media. An example of the tags are voice categories with probable error explanation developed or otherwise obtained from historical processing and/or databases.

Figure 9:
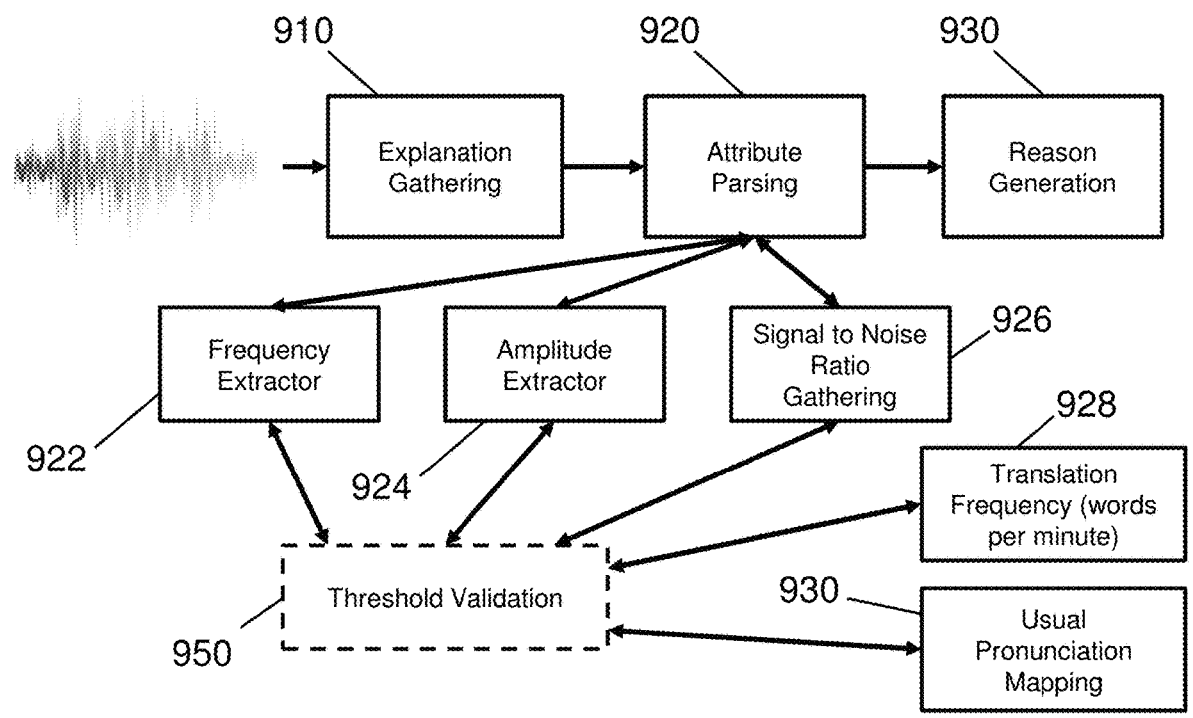
FIG. 9 shows a flowchart of an exemplary method in accordance with aspects of the invention.

FIG. 9 shows a summary flow of processing in an exemplary embodiment. In the example shown in FIG. 9, conversion explainability service 500 gathers explanations for erroneous conversions (910) by parsing attributes of an erroneous conversion (920), and generating reasons for the erroneous conversion (930). Attribute parsing 920 includes, in this example, extracting a frequency of the digital voice stream (922), extracting an amplitude of the digital voice stream (924), and gathering a signal-to-noise ratio of the digital voice stream (926). Conversion explainability service 500 determines a translation frequency (in, for example, words per minute) (928) and maps the erroneous conversion to recognized pronunciations of words/phonetics. Conversion explainability service 500 compares the above attributes, translation frequency, and pronunciation mapping to related thresholds to validate the information (950) as relevant to reason generation.

Figure 10:
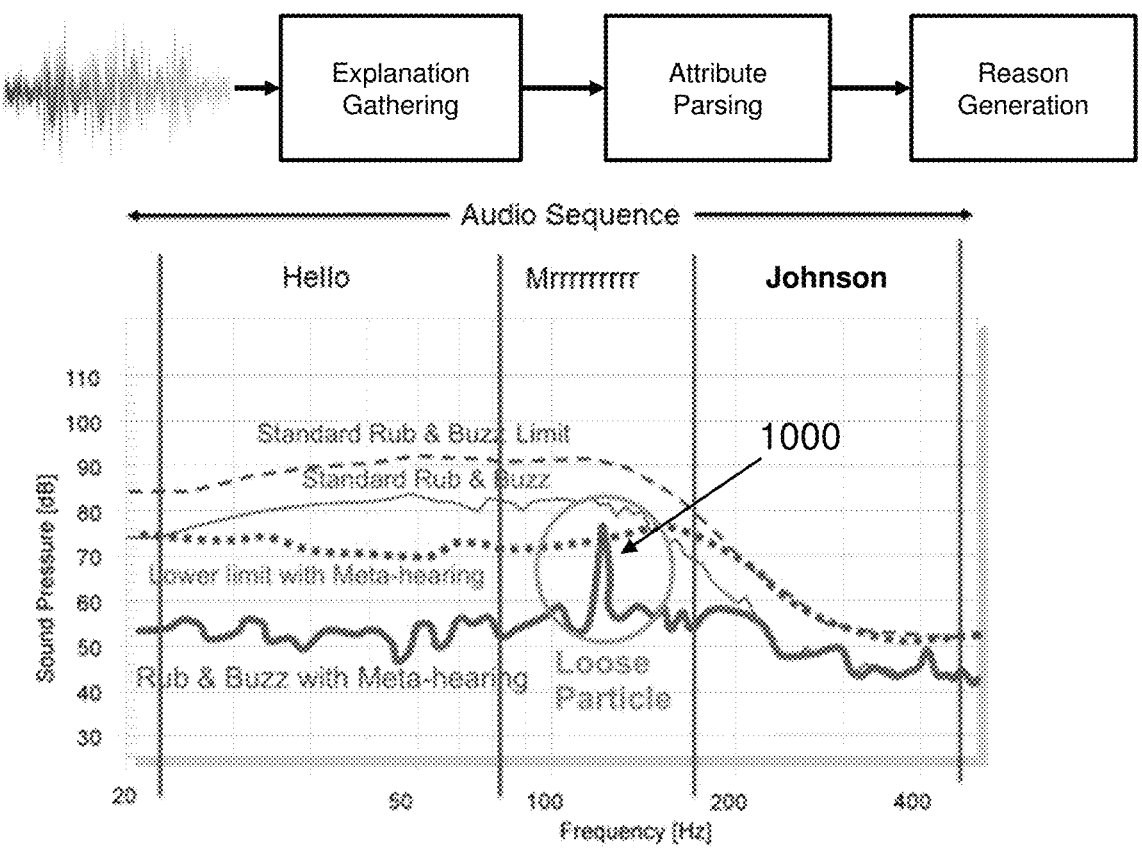
FIG. 10 shows an example of anomaly identification in accordance with aspects of the invention.

FIG. 10 shows an exemplary process of explanation gathering, attribute parsing, and reason generation and a graphical representation of the results from various algorithms analyzing the audio sequence in accordance with aspects of the invention. The spike 1000 labeled "Loose Particle" on the graph represents an anomaly in the audio sequence at the word "Mrrrrrrrr". FIG. 10 illustrates how embodiments use one or more algorithms to discover anomalies in an audio sequence. After conversion explainability service 500 has identified an anomaly such as that shown in FIG. 10, then conversion explainability service 500 performs the steps discussed above to produce one or more possible reasons for the anomaly.

Figure 11:
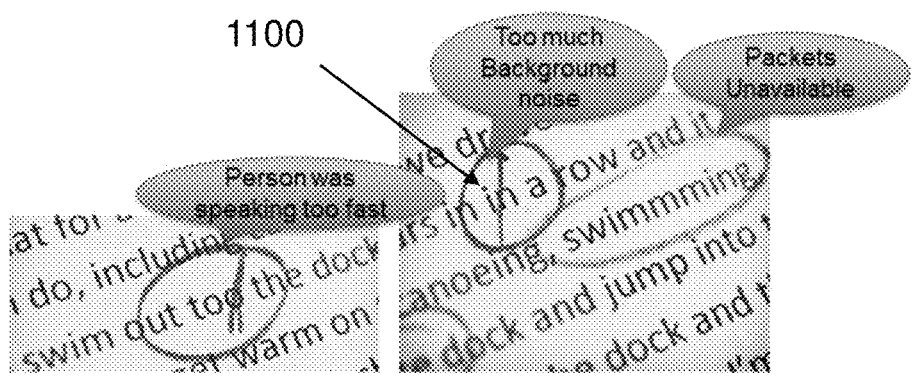
FIG. 11 shows a user interface in accordance with aspects of the invention.

FIG. 11 shows an example of a display, such as user interface 215, that shows a user possible reasons for erroneous conversions. For example, as referenced by reference number 1100, the double occurrence of "in" is possibly the result of too much background noise.

Figure 12:
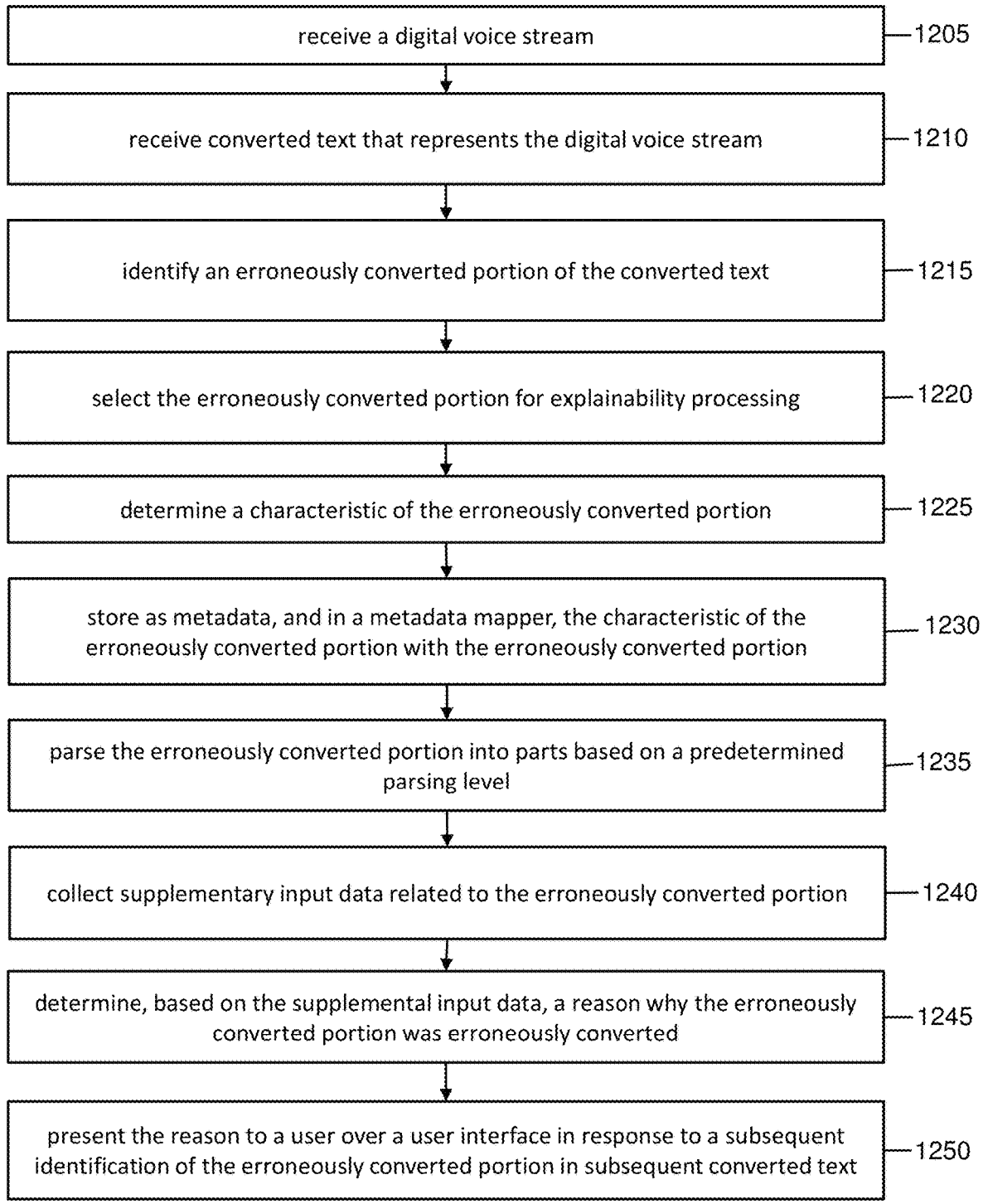
FIG. 12 shows a flowchart of an exemplary method in accordance with aspects of the invention.

FIG. 12 shows a flowchart of an exemplary method in accordance with aspects of the present invention. Steps of the method may be carried out in the environments of FIGS. 4 and 5 and are described with reference to elements depicted in FIGS. 4 and 5. As explained above, in embodiments, the features of conversion explainability service 500 are performed by translation explanation module 110 in FIG. 4.

At step 1205, the system receives a digital voice stream. In embodiments, and as described with respect to FIG. 4, translation explanation module 110 receives a digital voice stream from speech to text conversion system 300.

At step 1210, the system receives converted text that represents the digital voice stream. In embodiments, and as described with respect to FIG. 4, translation explanation module 110 receives converted text that represents the digital voice stream from speech to text conversion system 300.

At step 1215, the system identifies an erroneously converted portion of the converted text. In embodiments, translation explanation module 110 identifies an erroneously converted portion of the converted text received from speech to text conversion system 300 in step 1210. In embodiments, and as described with respect to FIG. 5, input media attribute gathering module 512 identifies an erroneously converted portion of the converted text received from speech to text conversion system 300 in step 1210.

At step 1220, the system selects the erroneously converted portion for explainability processing. In embodiments, translation explanation module 110 selects the erroneously converted portion identified in step 1215 for explainability processing. In embodiments, and as described with respect to FIG. 5, input media attribute gathering module 512 selects the erroneously converted portion identified in step 1215 for explainability processing.

At step 1225, the system determines a characteristic of the erroneously converted portion. In embodiments, translation explanation module 110 determines a characteristic of the erroneously converted portion identified in step 1215. In embodiments, media extractor 520 determines a characteristic of the erroneously converted portion identified in step 1215.

At step 1230, the system stores as metadata, and in a metadata mapper, the characteristic of the erroneously converted portion with the erroneously converted portion. In embodiments, translation explanation module 110 stores as metadata, and in storage device 120, the characteristic of the erroneously converted portion with the erroneously converted portion. In embodiments, metadata mappers module 562 stores as metadata the characteristic of the erroneously converted portion with the erroneously converted portion.

At step 1235, the system parses the erroneously converted portion into parts based on a predetermined parsing level. In embodiments, translation explanation module 110 parses the erroneously converted portion identified in step 1215 into parts based on a predetermined parsing level. In embodiments, input media attribute gathering module 512 parses the erroneously converted portion identified in step 1215 into parts based on a predetermined parsing level.

At step 1240, the system collects supplementary input data related to the erroneously converted portion. In embodiments, translation explanation module 110 collect supplementary input data related to the erroneously converted portion identified in step 1215. In embodiments, explainable model for STT converter 540 collects supplementary input data related to the erroneously converted portion identified in step 1215 from metadata mappers 562.

At step 1245, the system determines, based on the supplemental input data, a reason why the erroneously converted portion was erroneously converted. In embodiments, translation explanation module 110 determines, based on the supplemental input data collected in step 1240, a reason why the erroneously converted portion identified in step 1215 was erroneously converted by speech to text conversion system 300. In embodiments, explainable reasons extractor 546 determines, based on the supplemental input data collected in step 1240, a reason why the erroneously converted portion identified in step 1215 was erroneously converted by speech to text conversion system 300.

At step 1250, the system presents the reason to a user over a user interface in response to a subsequent identification of the erroneously converted portion in subsequent converted text. In embodiments, and as described with respect to FIG. 4, translation explanation module 110 presents the reason to a user over user interface 215 in response to a subsequent identification of the erroneously converted portion in subsequent converted text.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computing device, a digital voice stream;
receiving, by the computing device, converted text that represents the digital voice stream;
identifying, by the computing device, an erroneously converted portion of the converted text;
selecting, by the computing device, the erroneously converted portion for explainability processing;
parsing, by the computing device, the erroneously converted portion into parts based on a predetermined parsing level;
collecting, by the computing device, supplementary input data related to the erroneously converted portion;
determining, by the computing device and based on the supplemental input data, a reason why the erroneously converted portion was erroneously converted; and
saving, by the computing device, at least one tag along with the erroneously converted portion based on a threshold value being exceeded.

2. The method of claim 1, wherein the computing device receives the converted text from a speech to text conversion program that has converted the digital voice stream to the converted text, and the determining the reason further comprises mapping a characteristic of the erroneously converted portion with the reason that corresponds with the characteristic of the erroneously converted portions using a metadata mapper class.

3. The method of claim 1, further comprising determining, by the computing device, a characteristic of the erroneously converted portion,
wherein the determining the reason comprises analyzing the characteristic.

4. The method of claim 3, further comprising storing as metadata, by the computing device and in a metadata mapper, the characteristic of the erroneously converted portion with the erroneously converted portion.

5. The method of claim 4, wherein the computing device stores the metadata for future use by the computing device.

6. The method of claim 3, wherein the characteristic comprises a number of words per time unit spoken in the digital voice stream.

7. The method of claim 3, wherein the characteristic comprises a frequency of the digital voice stream.

8. The method of claim 1, wherein the reason comprises one selected from the group consisting of:
background noise;
a word not being pronounced properly;
a sound pressure level of the digital voice stream is lower than a threshold; and
a sound pressure level of the digital voice stream is higher than a threshold.

9. The method of claim 1, wherein the computing device performs the identifying by receiving an identification of the erroneous portion.

10. The method of claim 1, wherein the computing device performs the identifying by comparing the converted text to the digital voice stream.

11. The method of claim 1, wherein the parsing level is at a word level such that the erroneously converted portion is parsed into words.

12. The method of claim 1, wherein the computing device receives the voice stream as a Waveform Audio (WAV) file.

13. The method of claim 1, wherein the determining a reason comprises determining a plurality of reasons why the erroneously converted portion was erroneously converted, and the plurality of reasons comprises a word not being pronounced properly.

14. The method of claim 1, further comprising presenting, by the computing device, the reason to a user over a user interface in response to a subsequent identification of the erroneously converted portion in subsequent converted text.

15. A computer program product comprising one or more computer readable storage media having program instructions collectively stored on the one or more computer readable storage media, the program instructions executable to:
receive a digital voice stream;
receive converted text that represents the digital voice stream;
identify an erroneously converted portion of the converted text;
select the erroneously converted portion for explainability processing;
parse the erroneously converted portion into parts based on a predetermined parsing level;
collect supplementary input data related to the erroneously converted portion;
determine, based on the supplemental input data, a reason why the erroneously converted portion was erroneously converted; and
save at least one tag along with the erroneously converted portion based on a threshold value being exceeded.

16. The computer program product of claim 15, wherein the program instructions are executable to determine a characteristic of the erroneously converted portion,
wherein the determining the reason comprises analyzing the characteristic.

17. The computer program product of claim 15, wherein the determining the reason comprises determining a plurality of reasons why the erroneously converted portion was erroneously converted, and the plurality of reasons comprises a word not being pronounced properly.

18. The computer program product of claim 17, wherein the program instructions are executable to present the possible reasons to a user over a user interface in response to a subsequent identification of the erroneously converted portion in subsequent converted text, and the determining the reason further comprises mapping a characteristic of the erroneously converted portion with the reason that corresponds with the characteristic of the erroneously converted portions using a metadata mapper class.

19. The computer program product of claim 15, wherein:
the program instructions are executable to determine a characteristic of the erroneously converted portion;
the program instructions are executable to store as metadata, in a metadata mapper, the characteristic of the erroneously converted portion with the erroneously converted portion for future use; and
the determining the reason comprises analyzing the characteristic.

20. A system comprising:
a processor, a computer readable memory, one or more computer readable storage media, and program instructions collectively stored on the one or more computer readable storage media, the program instructions executable to:

receive a digital voice stream;
receive converted text that represents the digital voice stream;
identify an erroneously converted portion of the converted text;
select the erroneously converted portion for explainability processing;
parse the erroneously converted portion into parts based on a predetermined parsing level;
collect supplementary input data related to the erroneously converted portion;
determine, based on the supplemental input data, a reason why the erroneously converted portion was erroneously converted; and
save at least one tag along with the erroneously converted portion based on a threshold value being exceeded.

* * * * *